(No Model.)

C. H. WOODARD.
MILK HEATER.

No. 542,400. Patented July 9, 1895.

Witnesses:
R. J. Jacker
E. A. Duggan

Inventor:
Charles H. Woodard
By Chas. C. Tillman
Atty

UNITED STATES PATENT OFFICE.

CHARLES H. WOODARD, OF KANEVILLE, ILLINOIS.

MILK-HEATER.

SPECIFICATION forming part of Letters Patent No. 542,400, dated July 9, 1895.

Application filed March 18, 1895. Serial No. 542,098. (No model.)

*To all whom it may concern:*

Be it known that I, CHARLES H. WOODARD, a citizen of the United States, residing at Kaneville, in the county of Kane and State of Illinois, have invented certain new and useful Improvements in Milk-Heaters, of which the following is a specification.

This invention relates to improvements in apparatuses or devices for tempering milk, and it is especially adapted to be used in creameries; and it consists in certain peculiarities of the construction, novel arrangement, and operation of the various parts thereof, as will be hereinafter more fully set forth and specifically claimed.

In creameries a large vat or tank is used as a receptacle for the milk as it is received from different dairies, and the milk is consequently of different degrees of temperature when deposited into the receiving-vat. In order to properly separate the cream from the milk by means of separators, which are generally employed in creameries, it becomes necessary to temper the milk before it enters the separators to a certain and uniform degree, and therefore the objects of my invention are, first, to provide a milk-heater, which shall be simple and inexpensive in construction, strong and durable, yet effective in operation; second, such a heater which may be readily applied to and used in the ordinary receiving-vats usually employed in creameries, and, third, a heater in which the temperature may be easily regulated, so that the milk may be treated to a uniform degree of heat, thus facilitating the action of the separators.

In order to enable others skilled in the art to which my invention pertains to make and use the same, I will now proceed to describe it, referring to the accompanying drawings, in which—

Figure 1:
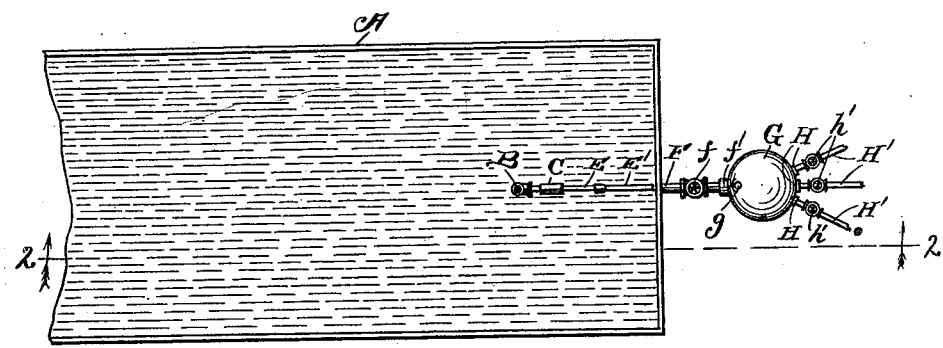
Figure 2:
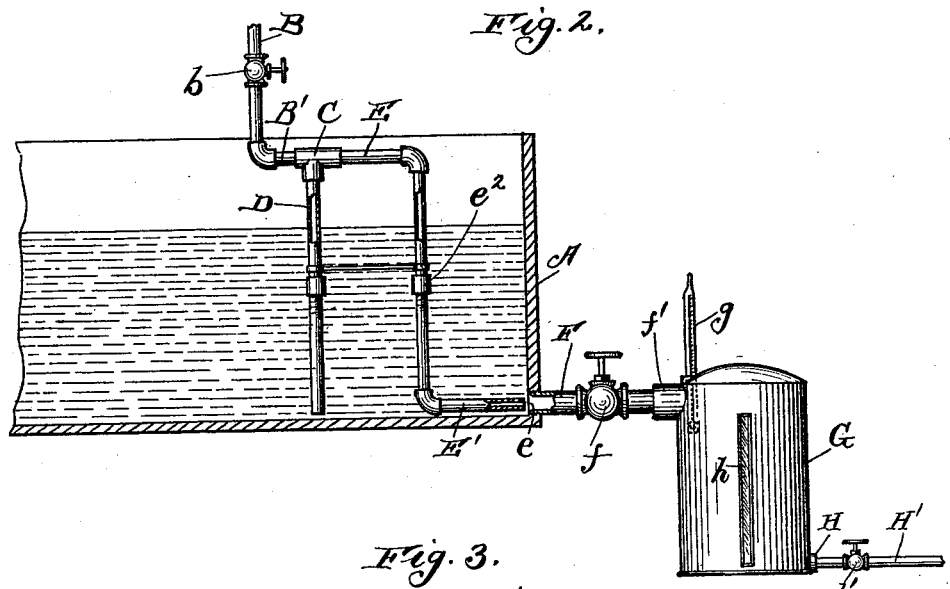
Figure 3:
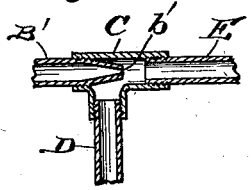

Figure 1 is a plan view of a portion of the receiving-vat with my heater applied thereto. Fig. 2 is a longitudinal sectional view taken on line 2 2 of Fig. 1, showing the heating apparatus and the receptacle for the heated or tempered milk in elevation; and Fig. 3 is a detail sectional view of a portion of the nozzle or steam-pipe, the suction or supply pipe, and the discharge-pipe.

Similar letters refer to like parts throughout the different views of the drawings.

A represents the receiving-vat, which may be made of any suitable size, form, and material, and into which the milk is deposited when received. Above this vat is located in any suitable manner a steam-pipe B, which is provided with a valve $b$, of the ordinary or any preferred kind to control the passage of steam through the pipe B, to the lower portion of which is connected or may be formed integral therewith a piece or nozzle B', which has its free end contracted, as at $b'$, as is clearly shown in Fig. 3 of the drawings. On the piece B' is secured a double-elbow coupling C, to the lower portion of which is connected a suction or supply pipe D for the milk, which may depend to any desired distance into the vat, but usually close to the bottom thereof, as shown in Fig. 2, in order that all of the milk in the vat may be drawn therethrough. To the end of the coupling C, opposite the portion thereof in which the nozzle B' is secured, is attached a discharge-pipe E, which extends horizontally with the piece B' for a short distance, and is then bent so as to extend vertically and downward to near the bottom of the vat and parallel with the suction-pipe D. The lower portion of the discharge-pipe E is provided with a joint or piece E', which extends horizontally to near the lower portion of the end of the vat, which is provided with an opening $e$, into which is fitted an outlet-pipe F, provided with a suitable valve $f$ to control the flow of milk through said pipe, the outer end of which is connected with and opens into a closed vessel or receptacle G for the reception of the heated milk, which vessel may be made of any suitable size, form, and material and located at any desired point or distance from the receiving-vat.

In the top of the vessel G and near the end $f'$ of the pipe F is secured a thermometer $g$, the bulb of which is located somewhat lower than the end $f'$ of the outlet-pipe, in order that the milk flowing from said pipe may fall on the bulb, and thus cause the thermometer to accurately indicate the temperature thereof.

In order that the quantity of milk within the vessel G may be ascertained at any time, I provide the same with a vertical opening, into which is fitted a piece of glass *h*, which renders the milk visible. To the lower portion of the receptacle or vessel G are connected pipes H, to each of which is secured a piece of hose H' to convey the milk to the separators, which are not shown, and which may be of the ordinary or any preferred kind. Each of the small pipes H' is provided with valves *h'* to regulate the flow of the milk through them, and as many of them may be used as are necessary.

By reference to Fig. 2 of the drawings it will be seen that the portion E' of the discharge-pipe E does not extend into the mouth or inner end of the pipe F, but extends near the same, thus allowing said portion to be turned to either side of the opening *e* when desired, and for this purpose the pipe E may be provided with a coupling $e^2$ near the center of its vertical portion. By reference to the last-named figure of the drawings it will also be seen that the opening of the outlet-pipe F is somewhat larger than the passage or channel of the portion E' of the discharge-pipe, which construction allows the milk to flow back into the vat from the receptacle G, should the same become filled.

The pipe F is provided with a valve *f* to control the flow of milk from the vat to the vessel G and to prevent it (the milk) running into the vessel until heated. It is also obvious that if the valve *f* should be left open and the valves or cut-offs *h'* on the pipes H' closed the vessel *g* would be filled with milk from the vat, and that the temperature thereof would be indicated by the thermometer.

From the foregoing and by reference to the drawings it will be seen and readily understood that by admitting steam from the pipe B, through the nozzle B', into the discharge-pipe E a vacuum will be formed at about the end *b'* of the nozzle, which will cause the milk to rise in the supply-pipe D, from whence it will be mingled with the steam and thereby heated and forced through the discharge-pipe E and into the outlet-pipe F, from whence it will flow into the receptacle G, from which it can be conducted to the separators through the pipes H' therefor.

Having thus fully described my invention, what I claim as new, and desire to secure by Letters Patent, is—

1. The combination with the receiving vat A, provided with the opening *e*, in its lower portion, of the steam pipe B, provided with the valve *b*, and nozzle-piece B', the double elbow coupling C, secured on the piece B', the suction or supply pipe D, connected at its upper end to said coupling near the orifice in the nozzle, the discharge pipe E, secured at one of its ends to the coupling opposite the nozzle and extending to near the opening *e*, in the lower portion of the vat, the outlet pipe F, secured at one of its ends in the opening *e*, and provided with the valve *f*, the receptacle G, at the other end of the pipe F, and the thermometer *g*, located in its upper portion near the opening of said pipe, all constructed, arranged and operating substantially as and for the purpose set forth.

2. The combination with the receiving vat A, provided with the opening *e*, in its lower portion, of the steam pipe B, provided with the valve *b*, and horizontal nozzle piece B', the double elbow coupling C, secured on the piece B', the suction or supply pipe D, connected at its upper end to said coupling near the orifice in the nozzle, the discharge pipe E, secured at one of its ends to the coupling opposite the nozzle, and located horizontally above the milk line and extending to near the opening *e*, in the lower portion of the vat, but disconnected from said opening, the outlet pipe F, secured at one of its ends in the opening *e*, and provided with the valve *f*, the receptacle G, at the other end of the pipe F, and the thermometer *g*, located in its upper portion near the opening of said pipe, all constructed, arranged and operating substantially as and for the purpose set forth.

CHARLES H. WOODARD.

Witnesses:
J. H. SCOTT,
MATTIE J. SCOTT.